United States Patent Office 3,008,914
Patented Nov. 14, 1961

3,008,914
COMPOSITION COMPRISING AN ACRYLIC ACID POLYMER AND A POLYGLYCIDYL ETHER AND PRODUCTS THEREOF
John S. Fry, Somerville, N.J., assignor to Union Carbide Corporation, a corporation of New York
No Drawing. Filed Oct. 6, 1958, Ser. No. 765,287
28 Claims. (Cl. 260—33.4)

This invention relates to improved coating compositions. More particularly, this invention relates to compositions comprising an acrylic acid polymer and a polyglycidyl ether of a polyphenylol having at least three phenylol groups in its molecule and having an epoxy equivalency of greater than two, which have particular utility as protective coatings for household articles such as dish washers, washing machines and the like.

Acryilc acid polymers, by reason of their excellent and lasting bonding strength, upon being applied as a coating and cured to an infusible, insoluble state, their ease of applicability and their excellent resistivity toward many chemicals have readily suggested themselves for use as protective coatings on various surfaces such as metal and wood surfaces.

The extensive use of acrylic acid polymers as protective coatings on household articles has been seriously limited, however, due to the poor resistivity of such polymers and compositions thereof to household detergens. Coating compositions based on acrylic acid polymers undergo a general degradation upon contact with household detergents, losing their desirable light color characteristics and becoming yellowish in appearance, blistering, and delaminating or separating from the coated article.

My present invention provides for a new class of compositions based on acrylic acid polymers which have particular utility as protective coatings on metal and wood surfaces and are extremely resistant to household detergents. The compositions of this invention, in addition to being resistant to household detergents, can be readily and easily applied as smooth coatings; exhibit excellent and lasting bonding strength to surfaces to which they have been applied upon being cured to an infusible, insoluble state, and have excellent chemical resistivity in general, in particular having excellent alkali and acid resistance. Moreover, the compositions of the present invention have excellent light color characteristics and retain these color characteristics even after prolonged exposure to household detergents.

The compositions of the present invention comprise a hardenable mixture of an acrylic acid polymer having an acrylic acid content polymerized therein of at least about 5 percent by weight, and a polyglycidyl ether of a polyphenylol having three or more phenylol groups in its molecule and having an epoxy equivalency of greater than two wherein there is present in the composition from about 0.85 to about 1.5 equivalent weights of the acrylic acid polymer based on the acrylic acid content thereof (i.e. free carboxyl groups available) per each equivalent weight of the polyglycidyl ether.

An acrylic acid monomer polymerizes through its olefinic unsaturation thereby producing a polymer having free carboxyl groups. For purposes of calculation of equivalent weights one carboxyl group is deemed to react with one epoxy group. The monomers which are reacted to produce the acrylic acid polymers are considered to polymerize quantitatively.

The acrylic acid polymers which are modified by the addition thereto of polyglycidyl ethers of polyphenylols having three or more phenylol groups in their molecule and having an epoxy equivalency of greater than two, to produce the compositions of the present invention are those polymers containing at least five percent by weight of acrylic acid polymerized therein; are in an intermediate, thermoplastic state, are soluble in inert organic solvents illustrative of which are the aromatic hydrocarbon solvents such as benzene, toluene, xylene and the like, the ketones such as methyl ethyl ketone and the like, esters such as ethyl acetate, propyl acetate and the like, nitroalkanes such as nitroethane, nitropropane and the like; and are capable of cross linking through their free carboxyl groups with the epoxy groups of the polyglycidyl ethers to produce hard, infusible, insoluble products.

Acrylic acid as used herein is intended to include substituted acrylic acids as well as acrylic acid per se. For example, in lieu of acrylic acid or in combination therewith substituted acrylic acids can be used to produce acrylic acid polymers having a total polymerized acrylic acid content of at least about 5 percent.

Particularly desirable substituted acrylic acids are the following: haloacrylic acids such as $\alpha$-chloro-acrylic acid, $\beta$-chloro-acrylic acid, $\alpha$-bromo-acrylic acid, $\beta$-bromo-acrylic acid; the alkyl and aryl substituted acrylic acids, illustrative of which are $\alpha,\beta$-dimethyl-acrylic acid, $\beta$-propyl-acrylic acid, $\alpha$-methyl-acrylic acid, cis-$\beta$-methyl-acrylic acid, trans-$\beta$-methyl-acrylic acid, and $\beta$-phenyl-acrylic acid.

By the term "acrylic acid polymers" there is intended to be included in addition to acrylic acid homopolymers, the copolymers, terpolymers and the like of acrylic acid and one or more ethylenically unsaturated compounds. Illustrative of such ethylenically unsaturated compounds are the following: acrylic acid esters such as methyl acrylate, ethyl acrylate, propyl acrylate, butyl acrylate, hexyl acrylate, 2-ethylhexyl-acrylate, dodecyl acrylate and the like; esters of alkyl, alkoxy and aryl substituted acrylic acids, such as methyl $\alpha$-methyl acrylate, ethyl-$\alpha$-methyl acrylate, propyl-$\alpha$-methyl acrylate, butyl-$\alpha$-methyl acrylate, octyl-$\alpha$-methyl acrylate, methyl-$\alpha,\beta$-di-methyl acrylate, ethyl-$\alpha,\beta$-di-methyl acrylate, ethyl-$\alpha,\beta$-di-ethyl acrylate, methoxy methyl-$\alpha$-methyl acrylate, methyl-$\beta$-phenyl acrylate and the like; alkyl and aryl esters of halo-acrylic acids such as methyl-$\alpha$-chloro-acrylate, phenyl-$\alpha$-chloro-acrylate and the like; nitriles such as methacrylonitrile, acrylonitrile and the like; vinyl and vinylidene halides such as vinyl chloride, vinyl fluoride, vinylidene chloride, vinylidene fluoride and the like; vinyl carboxylates such as vinyl acetate, vinyl chloro-acetate, vinyl propronate, vinyl lactate, vinyl oleate and the like; vinyl aryls such as styrene, o-methoxy styrene, p-methoxy styrene, m-methoxy styrene, o-nitrostyrene, m-nitrostyrene, o-methyl styrene, p-methyl styrene, m-methyl styrene, p-phenyl styrene, o-phenyl styrene, m-phenyl styrene, mono-vinyl naphthalene and the like. Additional ethylenically unsaturated compounds include tri-chloroethylene, chlorotrifluoroethylene, dibutyl maleate, vinyl cyclohexyl ether, allylidene diacetate, acrolein, vinyl pyrolidone and other similar type compounds.

A particularly desirable acrylic acid polymer is one wherein the acrylic acid content polymerized therein is from about 10 to about 15 percent by weight; the acrylonitrile or acrylic ester content polymerized therein is from about 15 to about 35 percent by weight, with the remainder being styrene.

Any of the well-known methods can be conveniently used to prepare the acrylic acid polymers. Such methods are illustrated in the examples of the instant application and are further illustrated by the methods disclosed in Patent 2,604,464 to Gordon Hart Segall et al. issued July 22, 1952, which is herewith incorporated by reference.

The polyglycidyl ethers of polyphenylols which are combined with the acrylic acid polymers to produce the compositions of this invention can be obtained by reacting in aqueous caustic alkali, an aliphatic chlorohydrin such as epichlorohydrin or glycerol dichlorohydrin with one or more polyhdric, polynuclear phenols or polyphenylols having three or more phenylol groups in their molecule.

Of particular utility for purposes of this invention are polyglycidyl ethers of polyphenylols having at least three phenylol groups in their molecule linked together by one or more unsaturated aldehyde residues and wherein the polyglycidyl ether has a 1,2-epoxy equivalency of greater than 2. Generally, such polyglycidyl ether contains $2x+1$ phenylol groups in their molecule which are linked together by $x$ number of unsaturated aldehyde residues

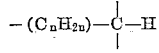

where $n$ is a whole number from 2 to 6 and $x$ is a whole number from 1 to 3.

For a detailed discussion of suitable polyglycidyl ethers of polyphenylols reference is made to Patent 2,801,989 to Alford G. Farnham, issued August 6, 1957, which is herewith incorporated by reference.

Other suitable polyglycidyl ethers of polyphenylols include the glycidyl ethers of the following compounds:

1,1,2,2-tetrakis(hydroxyphenyl)-ethane;
1,1,3,3-tetrakis(hydroxyphenyl)propane;
1,1,4,4-tetrakis(hydroxyphenyl)butane;
1,1,5,5-tetrakis(hydroxyphenyl)-3-methyl pentane;
1,1,4,4-tetrakis(hydroxyphenyl)-2-ethylbutane;
1,1,8,8-tetrakis(hydroxyphenyl)octane;
1,1,10,10-tetrakis(hydroxyphenyl)decane and the like as well as corresponding compounds containing substituent groups in the chain, such as 1,1,3,3-tetrakis(hydroxyphenyl)-2-chloropropane;
1,1,3,3-tetrakis(hydroxyphenyl)-2-nitropropane;
1,1,4,4-tetrakis(hydroxyphenyl)2,3-dibromobutane;
1,1,6,6-tetrakis(hydroxyphenyl)hexanol-2,
and 1,1,5,5-tetrakis(hydroxyphenyl)pentane.

Also, polyglycidyl ethers of similar tetraphenols having substituted hydroxyphenyl groups therein as well as polynuclear hydroxyaryl groups, for example the polyglycidyl ethers of such compounds as 1,1,2,2-tetrakis(2-hydroxy-5-methylphenyl)ethane;
1,1,3,3-tetrakis(4-hydroxy-2,6-ditertiary butyl phenyl)propane;
1,1,6,6-tetrakis(3-chloro-4-hydroxyphenyl)hexane;
1,1,4,4-tetrakis(2-hydroxynaphthyl)butane and the like. Also suitable are the polyglycidyl ethers of the novolak condensation products of phenols and a saturated or unsaturated aldehyde, said novolaks containing an average of from 3 to 20 or more phenylol groups per molecule (cf. book by T. S. Carswell entitled "Phenoplasts," published in 1947 by Interscience Publishers of New York).

According to the present invention the acrylic acid polymers and the polyglycidyl ethers are combined in amounts ranging from about 0.85 to about 1.5 equivalent weights of the acrylic acid polymer based on the acrylic acid content (i.e. free carboxyl groups available) per each equivalent weight of the polyglycidyl ether. Highly desirable compositions, however, are those wherein there is present from about 1 to about 1.1 equivalent weights of acrylic acid polymer per each equivalent weight of polyglycidyl ether. A composition having from about 1 to about 1.1 equivalent weights of acrylic acid polymer per equivalent weight of polyglycidyl ether, when applied as a coating on metal, wood or other surfaces, hardens or cures to an extremely hard but flexible product in addition to possessing all of the other desirable attributes previously mentioned.

A composition having either less than about 0.85 or more than 1.5 equivalent weights of acrylic acid polymer per each equivalent weight of polyglycidyl ether does not have good chemical and detergent resistivity and upon hardening or curing becomes increasingly brittle.

In preparing the compositions of this invention it is convenient to dissolve the acrylic acid polymers and the polyglycidyl ether product in inert organic solvents and to admix the solutions. Such a method of preparation is desirable as the resultant solution can be used directly as the coating solution. For example, suitable amounts of the acrylic acid polymer can be added to a solvent comprising a 50–50 mixture in parts by weight of xylene and methylethyl ketone to form a solution having a solids content of 50 percent by weight. To this solution can be added a solution of the polyglycidyl ether in toluene having a solids content of about 65 percent by weight. The solutions are thoroughly mixed and a small amount of butanol is added to form a resultant solution having a solids content of about 35 to 65 percent by weight. Such a solution can be used directly to coat metal, wood and other like surfaces by conventional coating procedures such as by dipping, brushing and spraying.

The actual organic solvents used to form solutions of the acrylic acid polymers and the polyglycidyl ether of the polyphenylols are not critical. Any of the common inert organic solvents or mixtures thereof can be used, including those already mentioned as being solvents for the acrylic acid polymers.

Butanol is often added to the coating solutions as it aids in obtaining coating solutions characterized by uniform flow. The actual amount of butanol added will vary, depending upon the coating solution involved.

The coating compositions of the present invention will harden to a hard, infusible and insoluble state without the application of heat or without the aid of a catalyst. It is desirable, however, to decrease the time required for hardening by applying heat to the compositions. The compositions, when applied as coatings, usually in the form of organic solutions, are heated on the order of from about 160 to 185° C. whereby the organic solvents are driven off and the composition cures or hardens to a hard, tough, infusible product having excellent chemical resistance, being highly resistant to household detergents and also being of a desirable light color. The time and temperature of the heating cycle will vary and depend upon the reactivity of the ingredients in the composition.

Any of the conventional catalysts used to cure or harden epoxide compositions can also be used to aid in hardening the compositions of the present invention. Among such catalysts are the following: organic amines and quaternary ammonium compounds, e.g., pyridine, piperidine, dimethyl aniline, diethylene triamine, tetramethyl ammonium chloride, tetramethyl ammonium acetate, tetramethyl benzyl ammonium acetate and the like, metallic salts such as lithium naphthanate, calcium naphthanate and the like; metal hydroxides such as lithium hydroxide and the like.

The catalysts, when used, are added in amounts ranging from about 0.004 to about 5 percent by weight based on the total weight of the acrylic acid polymer and the polyglycidyl ether.

The acrylic acid polymer-polyglycidyl ether compositions of the present invention can, if desired, be pigmented to produce enamels of various colors. The compositions are, however, of particular value when pigmented with a whitening agent such as titanium dioxide as such compositions are highly resistant to yellowing in the presence of household detergents. In general, the amount of pigment added will vary from about 10 to about 40 percent by weight, based on the total weight of acrylic acid polymer and polyglycidyl ether, depending on the opacity and gloss desired in the enamels formed.

Fillers such as asbestos, silica and the like can also be added to the present compositions as is well understood by those skilled in the art.

To further illustrate the present invention, a polyglycidyl ether of a polyphenylol having 3 phenylol groups in its molecule and having an epoxy equivalency of greater than 2, whose method of preparation is indicated below, was combined with acrylic acid polymers to produce compositions according to the present invention. The compositions so produced were subjected to the well-known "Tide" test to determine their resistivity to household detergents.

The "Tide" test is conducted by immersing a bonderized steel plate, which has been coated with the composition to be treated, in a 1 percent by weight aqueous solution of Tide detergent maintained at 70° C. The coated steel panel is allowed to remain immersed until it is determined visually that the coating has blistered, delaminated or discolored. The time at which blistering, delaminating or discoloring has occurred is noted and the test is considered at an end. If no deleterious effects are incurred by the coating after 800 hours, the test is also discontinued and the coating is stated to have a resistivity to household detergents in excess of 800 hours which is excellent.

"Tide" is the tradename for a synthetic detergent and wetting agent which is marketed by the Procter & Gamble Distributing Co. "Tide" is packaged and sold in the form of a white powder, is characterized by a high foam value and chemically is a sodium sulfonic laurate.

*Preparation of the polyglycidyl ether of a polyphenylol triphenylol*

To 2820 grams (30 mols) of phenol containing 1.8 cc. concentrated HCl (37%) there were added dropwise 168 grams (3 mols) acrolein at 40–45° C. The reaction was exothermic and cooling was required. It required one hour for all the acrolein to be added to the phenol. After the exothermic reaction ceased, heating was continued for one hour at 100° C. Unreacted phenol was then distilled off under reduced pressure (10–12 mm. Hg) to a temperature of 200° C. (thermometer bulb in the residue). The reddish colored residue was a liquid at 100° C. and solidified to a fusible brittle solid at room temperature. The yield was 865 grams or 90% theoretical based on a calculated molecular weight of 320 for a triphenylol derivative. Analysis of the product gave the following results: molecular weight 360; OH 15.1%; soluble in acetone and in ethyl alcohol and only slightly soluble in benzene. The determined molecular weight indicated that a major portion of the reaction product consisted of triphenylols.

Eight hundred grams of the triphenylol (7.5 equivalent OH groups) were dissolved in 525 grams ethyl alcohol and mixed with 2060 grams (22.5 mols) of epichlorohydrin in a flask equipped with agitator and reflux. Seven hundred and three grams of a 50% aqueous solution of sodium hydroxide were added at the following rates, maintaining a temperature of 60–61° C.; 10% during the first hour; 10% during the next one-half hour and 70% in the next hour. The temperature was then reduced to 50–55° C., and the remaining 10% added during one hour. The reaction mixture was heated an additional fifteen minutes at 55° F., then distilled under subatmospheric pressure (50–75 mm. Hg) to a residue temperature (thermometer bulb in residue) of 65° C. The residue remaining in the flask was dissolved in 2500 cc. toluene and transferred to a separatory funnel where it was washed until the wash water was no longer alkaline to litmus. The washed toluene solution of the residue was distilled under reduced pressure (50 mm. Hg) to a residue temperature of 110° C. The residual yield was 1180 grams, this being 96.8% theory based on resin. The residue was light amber in color, with a viscosity of 500,00 centipoises at 25° C.; by analysis it had an epoxy content of 180 grams/gram mol epoxy ether or an epoxy equivalency of 3.0; chloride content was 0.3%.

The polyglycidyl ether prepared as described above and which is hereafter referred to as polyglycidyl "A" was combined with acrylic acid polymers as described in the following examples to prepare compositions according to the present invention. These examples are included only for purposes of illustration and are not to be construed as in any way limiting the scope of this invention.

EXAMPLE I (a) *Preparation of an acrylic acid polymer containing 15 percent by weight acrylic acid polymerized therein*

75 parts by weight acrylic acid and 425 parts by weight styrene were dissolved in a solvent mixture comprising 250 parts by weight of methyl ethyl ketone and 250 parts by weight xylene. The mixture was heated to boiling (about 90–96° C.) and refluxed for 10 hours in the presence of 10 parts by weight of benzoyl peroxide. The yield of polymer was substantially quantitative. The equivalent weight of the polymer based on the acrylic acid content was 480.

(b) *Preparation of a coating composition of acrylic acid polymer and polyglycidyl ether*

114.4 parts by weight of the acrylic acid polymer solution described in (a) containing 55 parts by weight (0.12 equivalent weight) of the acrylic acid polymer based on the acrylic acid content were admixed thoroughly by stirring with 28.6 parts by weight of a 50–50 mixture in parts by weight methyl ethyl ketone and xylene containing 18.2 parts by weight (0.10 equivalent weight) of polyglycidyl "A," 0.25 part by weight of Lithium Nuodex (a commercially available lithium nahpthanate produced by the Nuodex Products Co. containing 1.4% by weight lithium) which is equivalent to 0.0046% by weight catalyst based on the total weight of acrylic acid polymer-polyglycidyl "A," and 30 parts by weight of butanol.

The resulting coating solution was applied onto bonderized steel panels, each 3 inches by 5 inches by 1/32 of an inch thick, by dipping the panels in a reservoir of the solution at a constant rate. Each steel panel was coated with a film of about 0.8 to 1 mil in thickness.

The coated panels were air dried at room temperature (about 25° C.) for about two hours and then baked in an oven for 25–30 minutes at 185° C.

The coatings were hard, tough, light in color and flexible as the coating did not crack when the panels were bent around a 1/8 inch mandrel.

The resistance of the coatings to household detergents was determined by subjecting two coated panels to the "Tide" test. The coatings on each panel showed no signs of blistering, delaminating or yellowing after 800 hours.

Resistivity of the coatings to alkali and acid was determined by immersing a coated panel in a 25% strength sodium hydroxide and another coated panel in 25% strength sulfuric acid. The panels were so immersed for one week. In each case the alkali and sulfuric acid had no deleterious effect on the coatings.

To further illustrate the criticality of the amount of acrylic acid polymer present in the compositions of the present invention with respect to the polyglycidyl ether content, two similar coating compositions, Control I and Control II were prepared in a manner and with the materials described in Example I with the exception that Control I contained 0.10 equivalent weight of acrylic acid polymer per one equivalent weight of polyglycidyl "A" and Control II contained 0.105 equivalent weight acrylic acid polymer per equivalent weight of polyglycidyl "A." Both compositions were then coated onto bonderized steel panels as described in Example I and subjected to the "Tide" test. Control I delaminated and yellowed after only 40 hours. Control II delaminated and yellowed after only 100 hours.

EXAMPLE II

*(a) Preparation of an acrylic acid polymer containing 10% by weight acrylic acid, 20% by weight acrylonitrile and 70% by weight styrene, polymerized therein*

60 parts by weight acrylic acid, 120 parts by weight of acrylonitrile and 420 parts by weight styrene were polymerized in a manner described in Example I. The yield of polymer was substantially quantitative. The equivalent weight based on acrylic acid content was 722.

*(b) Preparation of a coating composition of acrylic acid polymer and polyglycidyl ether*

168.3 parts by weight of the acrylic acid polymer solution of (a) containing 79.4 parts by weight of acrylic acid polymer (0.11 equivalent weight) were mixed with 28.6 parts of a 50/50 mixture in parts by weight of methyl ethyl ketone, xylene solution containing 18.2 parts by weight (0.10 equivalent weight) of polyglycidyl "A," 0.32 part by weight of Lithium Nuodex and 50 parts by weight of butanol.

Coated steel panels were prepared and tested in a manner described in Example I. Coating compositions subjected to the "Tide" test showed no signs of blistering, delaminating or yellowing after 800 hours.

In comparison to the excellent resistance to detergents exhibited by the compositions of Example II, two similar compositions, Control III and Control IV, were prepared according to the procedure described in Example I with the exception that Control III contained 0.1 equivalent weight of acrylic acid polymer per each equivalent weight of polyglycidyl ether. Control IV contained 0.105 equivalent weight of acrylic acid polymer per each equivalent weight of polyglycidyl ether. Control III delaminated after only 40 hours. Control IV delaminated after only 100 hours.

EXAMPLE III

*(A) Preparation of an acrylic acid polymer containing 15 percent by weight acrylic acid*

120 parts by weight of acrylic acid, 280 parts by weight methyl methacrylate and 400 parts by weight styrene were polymerized according to the manner described in Example I(a). The equivalent weight of the polymer based on acrylic acid content was 481.

*(b) Preparation of a coating composition comprising the acrylic acid polymer and the polyglycidyl ether.*

85.8 parts by weight of the polymer solution described above in (a) containing 52.8 parts by weight (0.11 equivalent weight) of the acrylic acid polymer was admixed with 28.6 parts of a 50–50 mixture in parts by weight of methyl ethyl ketone and xylene containing 18.2 parts by weight (0.1 equivalent weight) of polyglycidyl "A," 0.23 part by weight Lithium Nuodex and 50 parts by weight butanol.

Bonderized steel panels of the type described in Example I were coated with the coating composition solution of the present example in a manner also described in Example I. The coatings had a "Tide" resistance in excess of 800 hours. Control compositions V and VI containing respectively 0.1 and 0.105 equivalent weights of the acrylic acid polymer per each equivalent weight of the polyglycidyl ether, had a "Tide" resistance of only 40 and 400 hours respectively.

EXAMPLE IV

This example shows that excellent enamels can be prepared from the composition of the present invention.

An enamel based on the coating composition of Example I was prepared by admixing 175 parts of the coating composition solution of I(b) with 40 parts by weight of a 70% Cellosolve paste of titanium dioxide. A bonderized steel panel of the type used in the preceding examples was dip-coated with this enamel providing a coating of about 1.1 mils thick on the panel. The coated panel was air dried for 1 to 2 hours at room temperature (about 25° C.) and then baked for 25 minutes at 185° C. The coating was a hard white enamel of good gloss and color.

White enamels prepared in a similar manner with the formulations of Example II(b) and III(b) were also of excellent color and hardness.

The excellent "Tide" resistance of the compositions of the present invention is further illustrated by the comparison with a coating composition containing a diglycidyl ether of 2,2-bis(p-hydroxyphenyl)propane (in lieu of a polyglycidyl ether of a polyphenylol having at least three phenylol groups in its molecule and having an epoxy equivalency greater than one).

The diglycidyl ether of 2,2-bis(p-hydroxyphenyl) propane was of the type described in United States patent to Werner et al. 2,467,171. The composition containing the diglycidyl ether was prepared in a manner described in Example I(b) with the exception that 19.4 parts by weight of the diglycidyl ether were used. Also, no solvent was used for the diglycidyl ether.

Panels coated with the acrylic acid polymer-diglycidyl ether composition were immersed in a 1% by weight Tide solution at 70° C. The coatings blistered and delaminated after only 130 hours. The coatings of the present invention under similar test conditions showed no blistering, no yellowing and no delamination even after 800 hours.

What is claimed is:

1. A hardenable composition comprising a thermoplastic acrylic acid polymer which is a member selected from the group consisting of homopolymers of acrylic acid and polymers of acrylic acid and at least one other ethylenically unsaturated monomer polymerizable therewith which polymers contain at least about 5 percent by weight acrylic acid polymerized therein and a polyglycidyl ether of a polyphenylol having at least three phenylol groups in its molecule and having an epoxy equivalency greater than two, said composition containing from about 0.85 to about 1.5 equivalent weights of said acrylic acid polymer per each equivalent weight of said polyglycidyl ether.

2. A hardenable composition as defined in claim 1 wherein the polyphenylol has three phenylol groups in its molecule.

3. A hardenable composition as defined in claim 1 wherein the acrylic acid polymer is an acrylic acid homopolymer.

4. A hardenable composition as defined in claim 1 wherein the acrylic acid polymer is a copolymer of acrylic acid and styrene.

5. A hardenable composition as defined in claim 1 wherein the acrylic acid polymer is a terpolymer of acrylic acid, styrene and acrylonitrile wherein the acrylic acid content polymerized therein is from about 10 to about 15 percent by weight, the acrylonitrile content polymerized therein is from about 15 to about 35 percent by weight, with the remainder being styrene.

6. A hardenable composition as defined in claim 1 wherein the acrylic acid polymer is a terpolymer of acrylic acid, an acrylic acid ester and styrene wherein the acrylic acid content polymerized therein is from about 10 to about 15 percent by weight, the acrylic acid ester content polymerized therein is from about 15 to about 35 percent by weight, with the remainder being styrene.

7. A hardenable composition as defined in claim 6 wherein the acrylic acid ester is methyl methacrylate.

8. A hardenable composition comprising a thermoplastic acrylic acid polymer which is a member selected from the group consisting of homopolymers of acrylic acid and polymers of acrylic acid and at least one other ethylenically unsaturated monomer polymerizable therewith which polymers contain at least about 5 percent by weight acrylic acid polymerized therein and a polyglycidyl ether of a polyphenylol having at least three phenylol groups in its molecule and having an epoxy equivalency greater than two, said composition containing from about 1 to about 1.1 equivalent weights of said acrylic acid polymer per each equivalent weight of said polyglycidyl ether.

9. A hardenable composition as defined in claim 8 wherein the polyphenylol has three phenylol groups in its molecule.

10. A hardenable composition as defined in claim 8 wherein the acrylic acid polymer is an acrylic acid homopolymer.

11. A hardenable composition as defined in claim 8 wherein the acrylic acid polymer is a copolymer of acrylic acid and styrene.

12. A hardenable composition as defined in claim 8 wherein the acrylic acid polymer is a terpolymer of acrylic acid, styrene and acrylonitrile wherein the acrylic acid content polymerized therein is from about 10 to about 15 percent by weight, the acrylonitrile content polymerized therein is from about 15 to about 35 percent by weight, with the remainder being styrene.

13. A hardenable composition as defined in claim 8 wherein the acrylic acid polymer is a terpolymer of acrylic acid, an acrylic acid ester and styrene wherein the acrylic acid content polymerized therein is from about 10 to about 15 percent by weight, the acrylic acid ester content polymerized therein is from about 15 to about 35 percent by weight, with the remainder being styrene.

14. A hardenable composition as defined in claim 13 wherein the acrylic ester is methyl methacrylate.

15. The cured product of the composition defined in claim 1.

16. The cured product of the composition defined in claim 2.

17. The cured product of the composition defined in claim 3.

18. The cured product of the composition defined in claim 4.

19. The cured product of the composition defined in claim 5.

20. The cured product of the composition defined in claim 6.

21. The cured product of the composition defined in claim 7.

22. The cured product of the composition defined in claim 8.

23. A coating composition in an inert organic solvent comprising a thermoplastic acrylic acid polymer which is a member selected from the group consisting of homopolymers of acrylic acid and polymers of acrylic acid and at least one other ethylenically unsaturated monomer polymerizable therewith which polymers contain at least about 5 percent by weight acrylic acid polymerized therein and a polyglycidyl ether of a polyphenylol having at least three phenylol groups in its molecule and having an epoxy equivalency greater than two, said composition containing from about 0.85 to about 1.5 equivalent weights of said acrylic acid polymer per each equivalent weight of said polyglycidyl ether.

24. A coating composition in an inert organic solvent comprising a thermoplastic acrylic acid polymer which is a member selected from the group consisting of homopolymers of acrylic acid and polymers of acrylic acid and at least one other ethylenically unsaturated monomer polymerizable therewith which polymers contain at least about 5 percent by weight acrylic acid polymerized therein and a polyglycidyl ether of a polyphenylol having at least three phenylol groups in its molecule and having an epoxy equivalency greater than two, said composition containing from about 1 to about 1.1 equivalent weights of said acrylic acid polymer per each equivalent weight of said polyglycidyl ether.

25. A coating composition in an inert organic solvent containing butanol comprising a thermoplastic acrylic acid polymer which is a member selected from the group consisting of homopolymers of acrylic acid and polymers of acrylic acid and at least one other ethylenically unsaturated monomer polymerizable therewith which polymers contain at least about 5 percent by weight acrylic acid polymerized therein and a polyglycidyl ether of a polyphenylol having at least three phenylol groups in its molecule and having an epoxy equivalency greater than two, said composition containing from about 0.85 to about 1.5 equivalent weights of said acrylic acid polymer per each equivalent weight of said polyglycidyl ether.

26. A laminate comprising a base and as a coating thereon the cured product of a composition comprising a thermoplastic acrylic acid polymer which is a member selected from the group consisting of homopolymers of acrylic acid and polymers of acrylic acid and at least one other ethylenically unsaturated monomer polymerizable therewith which polymers contain at least about 5 percent by weight acrylic acid polymerized therein and a polyglycidyl ether of a polyphenylol having at least three phenylol groups in its molecule and having an epoxy equivalency greater than two, said composition containing from about 0.85 to about 1.5 equivalent weights of said acrylic polymer per each equivalent weight of said polyglycidyl ether.

27. A hardenable composition comprising a thermoplastic acrylic acid polymer which is a member selected from the group consisting of homopolymers of acrylic acid and polymers of acrylic acid and at least one other ethylenically unsaturated monomer polymerizable therewith which polymers contain at least about 5 percent by weight acrylic acid polymerized therein and a polyglycidyl ether of a polyphenylol which polyphenylol contains $2x+1$ phenylol groups in its molecule linked together by $x$ number of unsaturated aldehyde residues having the formula —$(C_nH_{2n})$—C—H where $n$ is a whole number from 2 to 6 and $x$ is a whole number from 1 to 3, and wherein the said polyglycidyl ether has an epoxy equivalency of greater than 2, said composition containing from about 0.85 to about 1.5 equivalent weights of said acrylic acid polymer per each equivalent weight of said polyglycidyl ether.

28. A composition as defined in claim 27 wherein the said composition contains from about 1 to about 1.1 equivalent weights of said acrylic acid polymer per each equivalent weight of said polyglycidyl ether.

References Cited in the file of this patent

UNITED STATES PATENTS

| | | |
|---|---|---|
| 2,662,870 | Allenby | Dec. 15, 1953 |
| 2,707,177 | Skiff et al. | Apr. 26, 1955 |
| 2,798,861 | Segal et al. | July 9, 1957 |
| 2,801,989 | Farnham | Aug. 6, 1957 |
| 2,884,339 | Danenberg | Apr. 28, 1959 |